United States Patent
Cheng et al.

(10) Patent No.: US 11,182,928 B2
(45) Date of Patent: Nov. 23, 2021

(54) METHOD AND APPARATUS FOR DETERMINING ROTATION ANGLE OF ENGINEERING MECHANICAL DEVICE

(71) Applicant: BEIJING BAIDU NETCOM SCIENCE AND TECHNOLOGY CO., LTD., Beijing (CN)

(72) Inventors: Xinjing Cheng, Beijing (CN); Ruigang Yang, Beijing (CN); Feixiang Lu, Beijing (CN); Yajue Yang, Beijing (CN); Hao Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 87 days.

(21) Appl. No.: 16/675,827

(22) Filed: Nov. 6, 2019

(65) Prior Publication Data
US 2020/0279402 A1 Sep. 3, 2020

(30) Foreign Application Priority Data
Feb. 28, 2019 (CN) .......................... 201910152372.9

(51) Int. Cl.
*G06K 9/00* (2006.01)
*G06K 9/62* (2006.01)
(Continued)

(52) U.S. Cl.
CPC .......... *G06T 7/97* (2017.01); *G06K 9/00711* (2013.01); *G06T 7/80* (2017.01); *G06T 2207/10028* (2013.01)

(58) Field of Classification Search
None
See application file for complete search history.

(56) References Cited

U.S. PATENT DOCUMENTS 8,363,979 B2 * 1/2013 Abraham ........... G01B 11/2755
382/285
8,909,467 B2 12/2014 Lee et al.
(Continued)

FOREIGN PATENT DOCUMENTS

CN 105045263 A 11/2015
CN 107220995 A 9/2017
(Continued)

OTHER PUBLICATIONS

Xiao et al., "3D Point Cloud Registration based on Planar Surfaces," 2012 IEEE International Conference on Multisensor Fusion and Integration for Intelligent Systems (MFI), Sep. 13-15, 2012, Hamburg, Germany (Year: 2012).*
(Continued)

*Primary Examiner* — Soo Shin
(74) *Attorney, Agent, or Firm* — Seed IP Law Group LLP

(57) ABSTRACT

Embodiments of the present disclosure provide a method, apparatus for determining a rotation angle of an engineering mechanical device, an electronic device and a computer readable medium. The method may include: acquiring a depth image sequence acquired by a binocular camera disposed at a rotating portion of the engineering mechanical device during rotation of the rotating portion of the engineering mechanical device; converting the depth image sequence into a three-dimensional point cloud sequence; and determining a matching point between three-dimensional point cloud frames in the three-dimensional point cloud sequence, determining a rotation angle of the binocular camera during the rotation of the rotating portion of the engineering mechanical device based on the matching point between the three-dimensional point cloud frames as the rotation angle of the engineering mechanical device.

15 Claims, 4 Drawing Sheets

(51) Int. Cl.
*G06T 7/00* (2017.01)
*G06T 7/246* (2017.01)
*G06T 7/285* (2017.01)
*G06T 7/33* (2017.01)
*G06T 7/73* (2017.01)
*G06T 7/80* (2017.01)

(56) References Cited

U.S. PATENT DOCUMENTS

| | | | |
|---|---|---|---|
| 2013/0108116 A1* | 5/2013 | Suzuki | G06T 7/75 382/106 |
| 2013/0156262 A1 | 6/2013 | Taguchi et al. | |
| 2014/0267699 A1* | 9/2014 | Dorrance | G06T 7/73 348/135 |
| 2017/0154204 A1* | 6/2017 | Ryu | G06K 9/4604 |
| 2017/0277197 A1* | 9/2017 | Liao | G06T 7/20 |
| 2019/0005668 A1* | 1/2019 | Sugimura | G06K 9/6267 |
| 2019/0122376 A1* | 4/2019 | Xi | G06K 9/00221 |
| 2021/0049376 A1* | 2/2021 | Cui | G06K 9/00664 |

FOREIGN PATENT DOCUMENTS

| | | |
|---|---|---|
| CN | 108335353 A | 7/2018 |
| CN | 109242960 A | 1/2019 |
| CN | 109308737 A | 2/2019 |
| JP | 2015-505759 A | 2/2015 |
| KR | 10-2009-0020251 A | 2/2009 |
| KR | 10-2014-0012771 A | 2/2014 |
| KR | 10-2015-0006958 A | 1/2015 |
| WO | 2015005577 A1 | 1/2015 |

OTHER PUBLICATIONS

Cheng et al., "Visual Odometry on the Mars Exploration Rovers," In Proc. The International Conf, on System, Man and Cybernetics, 903-10. Waikoloa, HI, USA: IEEE, 2005 (Year: 2005).*
Qi Wang, "Autonomous Machine Vision for Off-Road Vehicles in Unstructured Fields," Dissertation, University of Illinois at Urbana-Champaign, 2009 (Year: 2009).*
Korean Notice of Allowance for Korean Application No. 9-5-2021-069458438, dated Sep. 1, 2021, 2 pages.

* cited by examiner

METHOD AND APPARATUS FOR DETERMINING ROTATION ANGLE OF ENGINEERING MECHANICAL DEVICE

CROSS-REFERENCE TO RELATED APPLICATIONS

This application claims priority to Chinese Patent Application No. 201910152372.9, filed on Feb. 28, 2019, titled "Method and apparatus for determining rotation angle of engineering mechanical device," which is hereby incorporated by reference in its entirety.

TECHNICAL FIELD

Embodiments of the present disclosure relate to the field of computer technology, specifically to the field of engineering mechanical device, and more specifically to a method and apparatus for determining a rotation angle of an engineering mechanical device.

BACKGROUND

An unmanned engineering mechanical device is an intelligent engineering device that senses the object of an operation, plans operation behavior, and executes an operation instruction through various sensors. In the execution of an engineering task, the unmanned engineering mechanical device needs to rotate a rotating portion such as the body or the robot arm to a target area, therefore, it is necessary to accurately and quickly determine a rotation angle. The current solution is to install an angle sensor on the rotating shaft of the engineering mechanical device, relying on the real-time reading of the sensor to determine the rotation angle of the engineering mechanical device.

SUMMARY

Embodiments of the present disclosure propose a method, apparatus for determining a rotation angle of an engineering mechanical device, an electronic device and a computer readable medium.

In a first aspect, an embodiment of the present disclosure provides a method for determining a rotation angle of an engineering mechanical device, including: acquiring a depth image sequence acquired by a binocular camera disposed at a rotating portion of the engineering mechanical device during rotation of the rotating portion of the engineering mechanical device; converting the depth image sequence into a three-dimensional point cloud sequence; and determining a matching point between three-dimensional point cloud frames in the three-dimensional point cloud sequence, determining a rotation angle of the binocular camera during the rotation of the rotating portion of the engineering mechanical device based on the matching point between the three-dimensional point cloud frames as the rotation angle of the engineering mechanical device.

In some embodiments, the method further includes: acquiring rotation angle sensing data acquired by an angle sensor disposed on a rotating shaft of the rotating portion of the engineering mechanical device during the rotation of the rotating portion of the engineering mechanical device; and the determining a rotation angle of the binocular camera during the rotation of the rotating portion of the engineering mechanical device based on the matching point between the three-dimensional point cloud frames, includes: using rotation angle sensing data corresponding to the three-dimensional point cloud frames as an initial estimation range of a rotation angle corresponding to the three-dimensional point cloud frames, and determining the rotation angle of the binocular camera during the rotation of the rotating portion of the engineering mechanical device based on the matching point between the three-dimensional point cloud frames within the initial estimation range.

In some embodiments, the determining a matching point between three-dimensional point cloud frames in the three-dimensional point cloud sequence includes: determining, for each current three-dimensional point cloud frame in the three-dimensional point cloud sequence, a matching point between the current three-dimensional point cloud frame and a previous three-dimensional point cloud frame of the current three-dimensional point cloud frame; and the determining a rotation angle of the binocular camera during the rotation of the rotating portion of the engineering mechanical device based on the matching point between the three-dimensional point cloud frames as the rotation angle of the engineering mechanical device, includes: estimating, for each current three-dimensional point cloud frame in the three-dimensional point cloud sequence, based on three-dimensional coordinates of the matching point between the current three-dimensional point cloud frame and the previous three-dimensional point cloud frame of the current three-dimensional point cloud frame in the current three-dimensional point cloud frame and the previous three-dimensional point cloud frame of the current three-dimensional point cloud frame, a rotation angle between the current three-dimensional point cloud frame and a depth image frame corresponding to the previous three-dimensional point cloud frame of the current three-dimensional point cloud frame; and adding sequentially rotation angles between depth image frames corresponding to adjacent three-dimensional point cloud frames in the three-dimensional point cloud sequence according to positions of corresponding depth images in the depth image sequence, to obtain a relative rotation angle of the binocular camera when acquiring images between a first frame image and a last frame image in the depth image sequence as the rotation angle of the engineering mechanical device.

In some embodiments, the determining a matching point between three-dimensional point cloud frames in the three-dimensional point cloud sequence includes: sampling a three-dimensional point cloud frame in the three-dimensional point cloud sequence to obtain a sampling sequence, where the sampling sequence includes a first three-dimensional point cloud frame and a last three-dimensional point cloud frame in the three-dimensional point cloud sequence; determining, for each three-dimensional point cloud frame pair composed of adjacent three-dimensional point cloud frames in the sampling sequence, a matching point between two three-dimensional point cloud frames in the three-dimensional point cloud frame pair; and the determining a rotation angle of the binocular camera during the rotation of the rotating portion of the engineering mechanical device based on the matching point between the three-dimensional point cloud frames as the rotation angle of the engineering mechanical device, includes: estimating, based on three-dimensional coordinates of the matching point between the two three-dimensional point cloud frames in the three-dimensional point cloud frame pair, a rotation angle between depth image frames corresponding to the two three-dimensional point cloud frames in the three-dimensional point cloud frame pair; and adding sequentially rotation angles between depth image frames corresponding to two three-dimensional point cloud frames in three-dimensional point cloud frame pairs according to positions of corresponding depth images in the depth image sequence, to obtain a relative rotation angle of the binocular camera when acquiring images between a first frame image and a last frame image in the depth image sequence as the rotation angle of the engineering mechanical device.

In some embodiments, the determining a matching point between three-dimensional point cloud frames in the three-dimensional point cloud sequence includes: performing feature point extraction on the three-dimensional point cloud frames; and matching feature points of two extracted three-dimensional point cloud frames to obtain a matching point between the two three-dimensional point cloud frames.

In a second aspect, an embodiment of the present disclosure provides an apparatus for determining a rotation angle of an engineering mechanical device, including: a first acquisition unit, configured to acquire a depth image sequence acquired by a binocular camera disposed at a rotating portion of the engineering mechanical device during rotation of the rotating portion of the engineering mechanical device; a conversion unit, configured to convert the depth image sequence into a three-dimensional point cloud sequence; and a determining unit, configured to determine a matching point between three-dimensional point cloud frames in the three-dimensional point cloud sequence, determine a rotation angle of the binocular camera during the rotation of the rotating portion of the engineering mechanical device based on the matching point between the three-dimensional point cloud frames as the rotation angle of the engineering mechanical device.

In some embodiments, the apparatus further includes: a second acquisition unit, configured to acquire rotation angle sensing data acquired by an angle sensor disposed on a rotating shaft of the rotating portion of the engineering mechanical device during the rotation of the rotating portion of the engineering mechanical device; and the determining unit is further configured to determine a rotation angle of the binocular camera during the rotation of the rotating portion of the engineering mechanical device by: using rotation angle sensing data corresponding to the three-dimensional point cloud frames as an initial estimation range of a rotation angle corresponding to the three-dimensional point cloud frames, and determining the rotation angle of the binocular camera based on the matching point between the three-dimensional point cloud frames within the initial estimation range.

In some embodiments, the determining unit is further configured to determine a matching point between three-dimensional point cloud frames in the three-dimensional point cloud sequence by: determining, for each current three-dimensional point cloud frame in the three-dimensional point cloud sequence, a matching point between the current three-dimensional point cloud frame and a previous three-dimensional point cloud frame of the current three-dimensional point cloud frame; and the determining unit is further configured to determine a rotation angle of the binocular camera based on the matching point between the three-dimensional point cloud frames as the rotation angle of the engineering mechanical device by: estimating, for each current three-dimensional point cloud frame in the three-dimensional point cloud sequence, based on three-dimensional coordinates of the matching point between the current three-dimensional point cloud frame and the previous three-dimensional point cloud frame of the current three-dimensional point cloud frame in the current three-dimensional point cloud frame and the previous three-dimensional point cloud frame of the current three-dimensional point cloud frame, a rotation angle between the current three-dimensional point cloud frame and a depth image frame corresponding to the previous three-dimensional point cloud frame of the current three-dimensional point cloud frame; and adding sequentially rotation angles between depth image frames corresponding to adjacent three-dimensional point cloud frames in the three-dimensional point cloud sequence according to positions of corresponding depth images in the depth image sequence, to obtain a relative rotation angle of the binocular camera when acquiring images between a first frame image and a last frame image in the depth image sequence as the rotation angle of the engineering mechanical device.

In some embodiments, the determining unit is further configured to determine a matching point between three-dimensional point cloud frames in the three-dimensional point cloud sequence by: sampling a three-dimensional point cloud frame in the three-dimensional point cloud sequence to obtain a sampling sequence, where the sampling sequence includes a first three-dimensional point cloud frame and a last three-dimensional point cloud frame in the three-dimensional point cloud sequence; determining, for each three-dimensional point cloud frame pair composed of adjacent three-dimensional point cloud frames in the sampling sequence, a matching point between two three-dimensional point cloud frames in the three-dimensional point cloud frame pair; and the determining unit is further configured to determine a rotation angle of the binocular camera based on the matching point between the three-dimensional point cloud frames as the rotation angle of the engineering mechanical device by: estimating, based on three-dimensional coordinates of the matching point between the two three-dimensional point cloud frames in the three-dimensional point cloud frame pair, a rotation angle between depth image frames corresponding to the two three-dimensional point cloud frames in the three-dimensional point cloud frame pair; and adding sequentially rotation angles between depth image frames corresponding to two three-dimensional point cloud frames in three-dimensional point cloud frame pairs according to positions of corresponding depth images in the depth image sequence, to obtain a relative rotation angle of the binocular camera when acquiring images between a first frame image and a last frame image in the depth image sequence as the rotation angle of the engineering mechanical device.

In some embodiments, the determining unit is further configured to determine a matching point between three-dimensional point cloud frames in the three-dimensional point cloud sequence as follows: performing feature point extraction on the three-dimensional point cloud frames; and matching feature points of two extracted three-dimensional point cloud frames to obtain a matching point between the two three-dimensional point cloud frames.

In a third aspect, an embodiment of the present disclosure provides an electronic device, including: one or more processors; and a storage apparatus, for storing one or more programs, the one or more programs, when executed by the one or more processors, cause the one or more processors to implement the method for determining a rotation angle of an engineering mechanical device as provided by the first aspect.

In a fourth aspect, an embodiments of the present disclosure provides a computer readable medium, storing a computer program thereon, the program, when executed by a processor, implements the method for determining a rotation angle of an engineering mechanical device as provided by the first aspect.

The method and apparatus for determining a rotation angle of an engineering mechanical device provided by the above embodiments of the present disclosure, by acquiring a depth image sequence acquired by a binocular camera disposed at a rotating portion of the engineering mechanical device during rotation of the rotating portion of the engineering mechanical device, converting the depth image sequence into a three-dimensional point cloud sequence, and determining a matching point between three-dimensional point cloud frames in the three-dimensional point cloud sequence, determining a rotation angle of the binocular camera during the rotation of the rotating portion of the engineering mechanical device based on the matching point between the three-dimensional point cloud frames as the rotation angle of the engineering mechanical device, achieve accurate calculation of the rotation angle of the engineering mechanical device.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
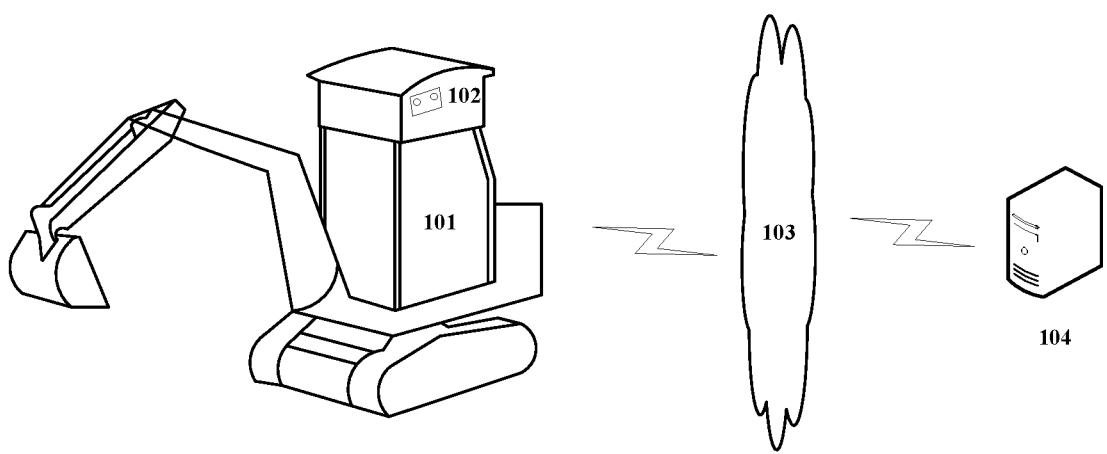
FIG. 1 is a diagram of an exemplary system architecture in which embodiments of the present disclosure may be implemented.

FIG. 1 illustrates an exemplary system architecture of a method for determining a rotation angle of an engineering mechanical device or an apparatus for determining a rotation angle of an engineering mechanical device in which embodiments of the present disclosure may be implemented.

As shown in FIG. 1, the system architecture 100 may include an engineering mechanical device 101, a camera 102 disposed on the engineering mechanical device, a network 103, and a server 104. The network 103 is used to provide a communication link medium between the engineering mechanical device 101, the camera 102, and the server 104. The network 103 may include various types of connections, such as wired, wireless communication links, or optic fibers.

The engineering mechanical device 101 may be an intelligent mechanical device such as an unmanned autonomous excavator or an unmanned autonomous crane. The engineering mechanical device 101 may be provided with various sensors such as an angle sensor, a mechanical sensor, and an image sensor. The various sensors on the engineering mechanical device 101 may sense environmental information including action object, road environment, and the like. In some scenarios, the engineering mechanical device 101 may also be provided with data processing components, for example, processors such as CPUs and GPUs, and storage components. The data processing component may acquire data sensed by the sensor for processing. The storage component may store the data sensed by the sensor, and store data that the data processing component needs to call when executing a data processing task.

The camera 102 may be a binocular camera, which may be an image sensor mounted on the engineering mechanical device 101 that may capture a depth image in the scenario in which the engineering mechanical device is located. The binocular camera 102 may be mounted on a rotating portion of the engineering mechanical device, for example, on the front or side of an excavator body. The binocular camera 102 may capture a depth image during the rotation of the rotating portion.

The server 104 may be a server that provides various services, such as a backend server of the engineering mechanical device. The backend server of the engineering mechanical device may perform processing such as image analysis, or key information extraction on a depth image sequence acquired from the camera 102, and control operation of the engineering mechanical device 101 based on a processing result (for example, pose information of the engineering mechanical device).

It should be noted that the server 104 may be hardware or software. When the server 104 is hardware, it may be implemented as a distributed server cluster composed of a plurality of servers, or as a single server. When the server 104 is software, it may be implemented as a plurality of programs or software modules (for example, a plurality of programs or software modules for providing distributed services) or as a single program or software module, which is not specifically limited herein.

It should be noted that the method for determining a rotation angle of an engineering mechanical device provided by the embodiments of the present disclosure may be performed by the data processing component disposed on the engineering mechanical device 101, or by the server 104. Correspondingly, the apparatus for determining a rotation angle of an engineering mechanical device may be disposed in the data processing component of the engineering mechanical device 101, or in the server 104.

It should be understood that the number of engineering mechanical devices, cameras, networks and servers in FIG. 1 is merely illustrative. Depending on the implementation needs, there may be any number of engineering mechanical devices, cameras, networks and servers.

Figure 2:
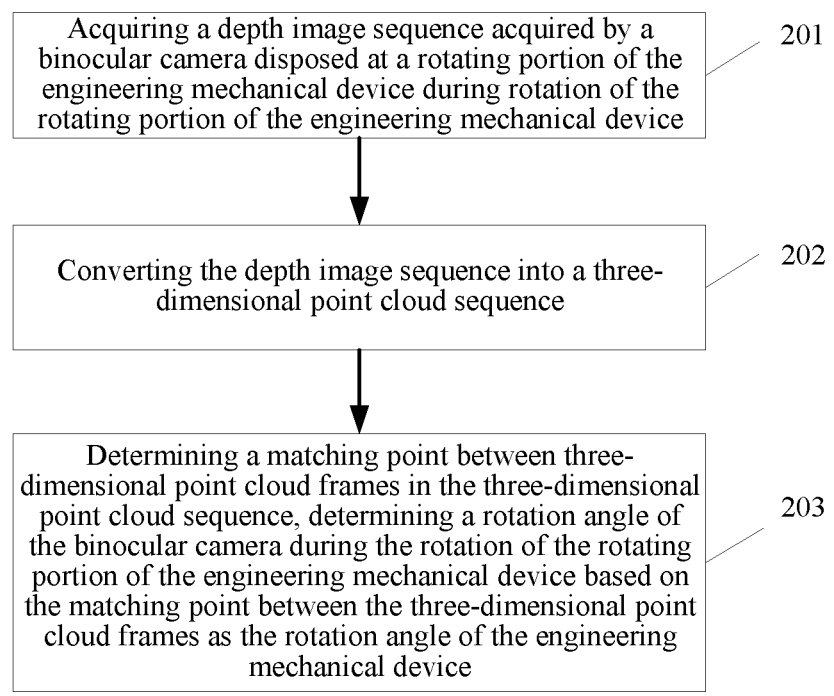
FIG. 2 is a flowchart of a method for determining a rotation angle of an engineering mechanical device according to an embodiment of the present disclosure.

With further reference to FIG. 2, a flow 200 of an embodiment of a method for determining a rotation angle of an engineering mechanical device according to the present disclosure is illustrated. The method for determining a rotation angle of an engineering mechanical device includes the following steps.

Step 201, acquiring a depth image sequence acquired by a binocular camera disposed at a rotating portion of the engineering mechanical device during rotation of the rotating portion of the engineering mechanical device.

In the present embodiment, an executing body of the method for determining a rotation angle of an engineering mechanical device may be connected to the binocular camera disposed at the rotating portion of the engineering mechanical device, to acquire the depth image sequence acquired by the binocular camera during the rotation of the rotating portion of the engineering mechanical device.

The engineering mechanical device may be a heavy equipment used in engineering machinery such as earthmoving machinery equipment, excavating machinery equipment, lifting machinery equipment, compaction machinery equipment, or pile machinery equipment, for example, an excavator, a crane, or the like. The engineering mechanical device in the present embodiment includes a rotating portion. The rotating portion may rotate about the rotation shaft on the engineering mechanical device. The rotating portion may be, for example, a body of an excavator, a boom of a crane, an operation room, or the like. The rotating portion of the engineering mechanical device is provided with a binocular camera. The relative position of the binocular camera and the rotating portion of the engineering mechanical device is fixed. When executing an engineering task, the engineering mechanical device needs to rotate its rotating portion to move to a task position. For example, the excavator needs to rotate the body to move to a material pile and excavate material from the material pile, then transport the excavated material to the target position and rotate the body to unload the material. When the rotating portion of the engineering mechanical device rotates, the binocular camera rotates therewith, and the rotation angle of the rotating portion coincides with the rotation angle of the binocular camera. The binocular camera captures an image of an engineering scenario in varying relative poses during the rotation.

A binocular camera may capture an image containing depth information, i.e., a depth image. The above binocular camera may consist of two cameras that have been calibrated for relative positional relationship. In some embodiments, the above binocular camera may further include processing components for fusing planar images captured by the two cameras to form a depth image.

In practice, a remote server or the processing component disposed on the engineering mechanical device may initiate the binocular camera to capture the depth image sequence during the rotation of the rotating portion of the engineering mechanical device, when an instruction instructing rotation of the rotating portion of the engineering mechanical device is issued. After the binocular camera captures a depth image, the depth image may be transmitted to the executing body (i.e., the above remote server or processing component disposed on the engineering mechanical device) in real time.

Step 202, converting the depth image sequence into a three-dimensional point cloud sequence.

In the present embodiment, for a depth image in the depth image sequence, image information in the depth image may be mapped into the three-dimensional space based on an internal parameter matrix of the binocular camera to obtain a corresponding three-dimensional point cloud. Specifically, for each pixel point P(u, v) in the depth image, the corresponding depth value is $z_c$, and the world coordinates of the point in the corresponding three-dimensional point cloud are $(x_w, y_w, z_w)$, with the following relationship:

$$z_c \begin{pmatrix} u \\ v \\ 1 \end{pmatrix} = \begin{bmatrix} f/dx & 0 & u_0 \\ 0 & f/dy & v_0 \\ 0 & 0 & 1 \end{bmatrix} [R_S \; T_S] \begin{bmatrix} x_w \\ y_w \\ z_w \\ 1 \end{bmatrix}, \quad (1)$$

Here, u, and v are the two-dimensional image coordinates of the pixel point P; $u_0$, and $v_0$ are the center coordinates of the image respectively; $R_s$, and $T_s$ are the rotation matrix and translation matrix in an external parameter matrix of the binocular camera respectively; $d_x$, and $d_y$ are the cell sizes of the camera; and f is the camera focal length.

Here, the camera origin coincides with the origin of the world coordinate system, thus, $$R_s = \begin{bmatrix} 0 & 0 & 0 \\ 0 & 1 & 0 \\ 0 & 0 & 1 \end{bmatrix}, \quad (2)$$

$$T_s = \begin{bmatrix} 0 \\ 0 \\ 0 \end{bmatrix}. \quad (3)$$

The depth of the point in the camera coordinate system is the same as the depth of the point in the world coordinate system, thus $z_w = z_c$.

Thereby, the three-dimensional spatial coordinates of the corresponding three-dimensional points may be calculated and obtained based on the image coordinates of the pixel points in the image, thereby mapping the depth image into the three-dimensional space to obtain the corresponding three-dimensional point cloud.

The above operation may be performed on each depth frame image in the depth image sequence, and a three-dimensional point cloud sequence formed by three-dimensional point cloud frames corresponding one-to-one with the depth images in the depth image sequence may be obtained.

Step 203, determining a matching point between three-dimensional point cloud frames in the three-dimensional point cloud sequence, determining a rotation angle of the binocular camera during the rotation of the rotating portion of the engineering mechanical device based on the matching point between the three-dimensional point cloud frames as the rotation angle of the engineering mechanical device.

In the present embodiment, a pose difference of the camera when acquiring different depth image frames corresponding to different three-dimensional point cloud frames may be calculated based on the matching point between the three-dimensional point cloud frames in the three-dimensional point cloud sequence. The matching point between two three-dimensional point cloud frames may characterize the same point in the physical space.

Specifically, the matching point between the three-dimensional point cloud frames may be extracted first. The points in different three-dimensional point cloud frames may be matched based on the spatial coordinates of the points, and the reflection intensity or color information of the points in the three-dimensional point cloud frames, to extract the matching point. For example, the set of matching points of two three-dimensional point cloud frames are respectively recorded as $X = x_1, x_2, x_3, \ldots, x_m$ and $Y = y_1, y_2, y_3, \ldots y_m$. Here, m is a positive integer and may be the total number of all matching points in the two point cloud frames; and $x_i$ and $y_i$ are a pair of matching points, and i=1, 2, 3, . . . , m.

Alternatively, the matching point between the three-dimensional point cloud frames in the three-dimensional point cloud sequence may be determined as follows: performing feature point extraction on the three-dimensional point cloud frames by using various three-dimensional feature extraction methods; and then matching feature points of two extracted three-dimensional point cloud frames to obtain a matching point between the two three-dimensional point cloud frames. When matching feature points, the relative distance between the two may be calculated to determine whether it is within a preset distance range, or the color or reflection intensity information of the two may be compared, and the matching of the feature points between the two three-dimensional point cloud frames may also be performed by combining the relative positional relationship between the feature points and other feature points in the same three-dimensional point cloud frame.

Then, an ICP (Iterative Closest Point) algorithm may be used to sequentially register the three-dimensional point cloud frames in the three-dimensional point cloud sequence to determine the conversion relationship between the three-dimensional point cloud frames. Here, the conversion relationship may include a rotation matrix R and a translation matrix T representations. The rotation matrix R and the translation matrix T may be derived by minimizing the mean square error e(X, Y) as follows.

$$e(X, Y) = \sum_{i=1}^{m} (Rx_i + T - y_i)^2 \quad (4)$$

Here, $x_i$ and $y_i$ may represent the three-dimensional coordinates of the corresponding matching point.

By initializing the rotation matrix R and the translation matrix T, and constantly iterative updating the rotation matrix R and the translation matrix T to reduce the mean square error e(X, Y), the iteration may be stopped when the mean square error reaches a certain convergence condition, and the estimated rotation matrix R and translation matrix T may be obtained. Further, based on the rotation angles of the rotation matrix corresponding to the coordinate axes, the relative rotation angle of the binocular camera when acquiring the depth images corresponding to the two three-dimensional point cloud frames is obtained.

The rotation angle estimation operation may be performed sequentially on the adjacent three-dimensional point cloud frames in the three-dimensional point cloud sequence, and the rotation angle corresponding to each adjacent two frames is added to obtain a rotation angle of the camera during the rotation of the rotating portion of the engineering mechanical device. The rotation angle may alternatively be estimated by using the ICP algorithm for the first three-dimensional point cloud frame and the last three-dimensional point cloud frame in the three-dimensional point cloud sequence to obtain the rotation angle of the camera during the rotation of the rotating portion of the engineering mechanical device.

In some alternative implementations of the present embodiment, the rotation angle between the depth image frames corresponding to the two three-dimensional point cloud frames in step 203 may be calculated as follows: determining an initial rotation matrix R and a translation matrix T, and then finding the nearest point $y_i$ in the three-dimensional point cloud frame Y based on the current rotation matrix R and the translation matrix T for each point $x_i$ in the three-dimensional point cloud frame X as the match point, and then calculating the mean square error e(X, Y).

The back-propagation method may be used to iteratively update the rotation matrix R and the translation matrix T, the mean square error is back-propagated into the rotation matrix R and the translation matrix T, and the step of finding the nearest point $y_i$ in the three-dimensional point cloud frame Y based on the current rotation matrix R and the translation matrix T for each point $x_i$ in the three-dimensional point cloud frame X as the match point, and then calculation of the mean square error e (X, Y) is performed for multiple times. After the mean square error is less than a preset threshold or the number of times of iteration reaches a preset number of times, the iteration is stopped, and the estimated rotation angle between the depth image frames corresponding to the two three-dimensional point cloud frames is obtained. In this way, the matching point may be found in the process of iteratively updating the rotation matrix R and the translation matrix T, so as to avoid the accuracy of the rotation matrix R and the translation matrix T being affected by a predetermined inaccurate matching point.

In the conventional method of acquiring an engineering mechanical device sensor based on an angle sensor, the accuracy of the angle sensor is easily affected by dust in the working environment and vibration of the engineering mechanical device. The method for determining a rotation angle of an engineering mechanical device of the above embodiment of the present disclosure, by acquiring a depth image sequence acquired by a binocular camera disposed at a rotating portion of the engineering mechanical device during rotation of the rotating portion of the engineering mechanical device, converting the depth image sequence into a three-dimensional point cloud sequence, and determining a matching point between three-dimensional point cloud frames in the three-dimensional point cloud sequence, determining a rotation angle of the binocular camera during the rotation of the rotating portion of the engineering mechanical device based on the matching point between the three-dimensional point cloud frames as the rotation angle of the engineering mechanical device, avoiding the effect of the engineering mechanical device environment dust and equipment vibration on the calculation of the rotation angle accuracy, achieving accurate calculation of the rotation angle of the engineering mechanical device.

Figure 3:
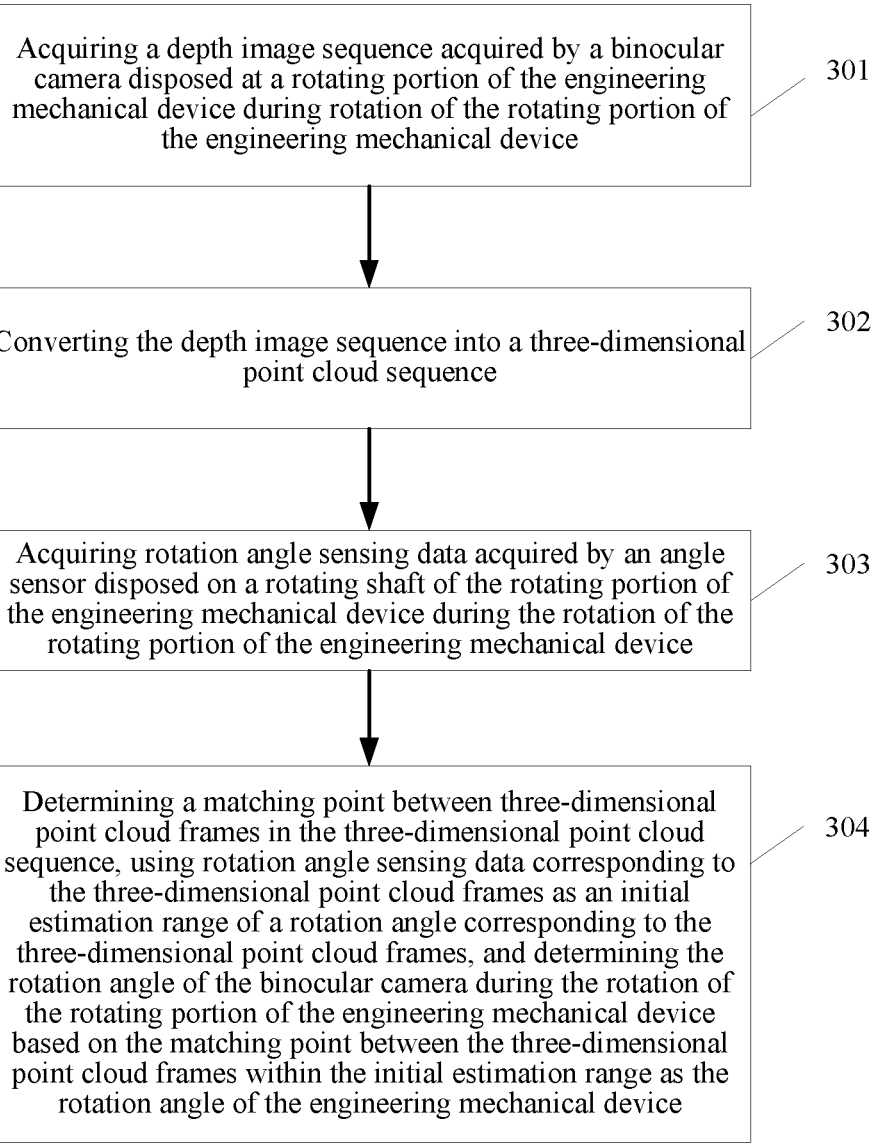
FIG. 3 is a flowchart of the method for determining a rotation angle of an engineering mechanical device according to of another embodiment the present disclosure.

With further reference to FIG. 3, a flowchart of the method for determining a rotation angle of an engineering mechanical device according to another embodiment of the present disclosure is illustrated. As shown in FIG. 3, the flow 300 of the method for determining a rotation angle of an engineering mechanical device of the present embodiment includes the following steps.

Step 301, acquiring a depth image sequence acquired by a binocular camera disposed at a rotating portion of the engineering mechanical device during rotation of the rotating portion of the engineering mechanical device.

In the present embodiment, the executing body of the method for determining a rotation angle of an engineering mechanical device may be connected to the binocular camera disposed at the rotating portion of the engineering mechanical device, to acquire the depth image sequence acquired by the binocular camera during the rotation of the rotating portion of the engineering mechanical device. Here, the engineering mechanical device may be an unmanned autonomous engineering mechanical device that performs a control operation by a remote server or a processing component disposed in the engineering mechanical device. The binocular camera is disposed at the rotating portion of the engineering mechanical device and may rotate with the rotating portion. During the rotation process, the binocular camera may acquire a depth image sequence within its field of view, and an acquired depth image may be a depth image of the operation object in the operation scene.

Step 302, converting the depth image sequence into a three-dimensional point cloud sequence.

Each frame of depth image in the depth image sequence may be converted into a corresponding three-dimensional point cloud frame to obtain a three-dimensional point cloud sequence corresponding to the depth image sequence. Specifically, for each pixel point in the depth image, the two-dimensional coordinates and depth value of the pixel point may be converted into three-dimensional coordinates in the three-dimensional space based on internal parameters of the camera.

The steps 301 and 302 of the present embodiment are respectively consistent with the steps 201 and 202 of the foregoing embodiment. The specific implementations of the steps 301 and 302 may refer to the foregoing descriptions of the steps 201 and 202, respectively, and repeated description thereof will be omitted.

Step 303, acquiring rotation angle sensing data acquired by an angle sensor disposed on a rotating shaft of the rotating portion of the engineering mechanical device during the rotation of the rotating portion of the engineering mechanical device.

In the present embodiment, the angle sensor may be disposed on the rotating shaft of the rotating portion of the engineering mechanical device. The rotating portion of the engineering mechanical device is rotatable about the rotating shaft. When the rotating portion of the engineering mechanical device rotates, the angle sensor disposed on the rotating shaft may sense the rotation angle of the rotating shaft to generate the rotation angle sensing data.

Here, the angle sensor may acquire data at a certain frequency, for example, the frequency is 100 Hz, and the obtained rotation angle sensing data may be a sequence formed by rotation angle sensing values at different times during the rotation.

It should be noted that, in the present embodiment, the performing sequence of the foregoing steps 301 and 302, and the step 303 may be mutually exchanged, and the step 303 may also be performed simultaneously with the step 301 or the step 302. That is, step 301 and step 302 may be performed first, and then step 303 may be performed; or step 303 may be performed to obtain the rotation angle sensing data generated by the angle sensor, and then step 301 and step 302 are performed to acquire the three-dimensional point cloud sequence; and the steps 301 and 303 may alternatively be performed simultaneously, that is, the rotation angle sensing data and the depth image sequence are acquired simultaneously.

Step 304, determining a matching point between three-dimensional point cloud frames in the three-dimensional point cloud sequence, using rotation angle sensing data corresponding to the three-dimensional point cloud frames as an initial estimation range of a rotation angle corresponding to the three-dimensional point cloud frames, and determining the rotation angle of the binocular camera during the rotation of the rotating portion of the engineering mechanical device based on the matching point between the three-dimensional point cloud frames within the initial estimation range as the rotation angle of the engineering mechanical device.

In the present embodiment, the points in different three-dimensional point cloud frames may be first matched based on the spatial coordinates of the points, and the reflection intensity or color information of the points in the three-dimensional point cloud frames, to extract the matching point.

Alternatively, the matching point between the three-dimensional point cloud frames in the three-dimensional point cloud sequence may be determined as follows: performing feature point extraction on the three-dimensional point cloud frames by using various three-dimensional feature extraction methods; and then matching feature points of two extracted three-dimensional point cloud frames to obtain a matching point between the two three-dimensional point cloud frames. When matching feature points, the relative distance between the two may be calculated to determine whether it is within a preset distance range, or the color or reflection intensity information of the two may be compared, and the matching of the feature points between the two three-dimensional point cloud frames may alternatively be performed by combining the relative positional relationship between the feature points and other feature points in a given three-dimensional point cloud frame.

Then, the initial estimation range of the rotation angle corresponding to each of the three-dimensional point cloud frames may be determined based on the rotation angle sensing data acquired in step 303. Here, the rotation angle corresponding to the three-dimensional point cloud frame may be the difference of the angle of the camera at the time of acquiring the two images corresponding to the two three-dimensional point cloud frames.

The binocular camera typically acquires images at a certain frequency, and the frequency is the difference between the acquisition time of two adjacent images in the acquired depth image sequence. The angle sensor also generates rotation angle sensing data at a certain frequency. The rotation angle sensing data corresponding to each depth image frame may be determined based on the image acquisition frequency of the binocular camera and the angle sensing frequency of the angle sensor as the rotation angle sensing data corresponding to the corresponding three-dimensional point cloud frame. Here, the rotation angle sensing data of the binocular camera when acquiring a first depth image frame may be set to be zero. Alternatively, the difference between rotation angle sensing data corresponding to two image frames may be determined based on the time of the image acquisition and the angle sensor respectively acquiring the image and the rotation angle sensing data, as the rotation angle sensing data corresponding to the two three-dimensional point cloud frames converted from the two image frames.

In the present embodiment, a range of values near the rotation angle data may be determined as the initial estimation range of the rotation angle, for example, an interval length of the estimation range may be set, and an interval that satisfies the interval length and includes the rotation angle sensing data may be selected as the initial estimation range of the rotation angle. Alternatively, the initial estimation range of the rotation angle corresponding to the corresponding three-dimensional point cloud frame may be obtained by superimposing the error of the angle sensor on the rotation angle sensing data corresponding to the three-dimensional point cloud frame. For example, the rotation angle sensing data is A (where A may be a set of values characterizing the rotation angle components of three coordinate axes in the space), the error is $\Delta$, and the initial estimation range may be $[A-\Delta, A+\Delta]$.

Then, the method for determining the rotation angle of the binocular camera described in step 203 may be used to estimate the rotation angle of the binocular camera within the initial estimation range. For example, values of a set of rotation angles may be randomly selected within the initial estimation range as initial values of the rotation matrix R, and the rotation matrix R is iteratively updated based on the coordinates of a matching point between the corresponding two three-dimensional point cloud frames to obtain the rotation angle corresponding to the two three-dimensional point cloud frames. Then, the above method for estimating the rotation angle between the depth image frames corresponding to the three-dimensional point cloud frame is sequentially performed on the three-dimensional point cloud frames in the three-dimensional point cloud sequence, to obtain an estimated value of the rotation angle of the binocular camera as the rotation angle of the rotating portion of the engineering mechanical device.

The flow 300 of the method for determining a rotation angle of an engineering mechanical device of the present embodiment, by the added step of acquiring rotation angle sensing data acquired by an angle sensor disposed on a rotating shaft of the rotating portion of the engineering mechanical device during the rotation of the rotating portion of the engineering mechanical device, performing rotation angle estimation by using the rotation angle sensing data as an initial estimation range of the rotation angle corresponding to the three-dimensional point cloud frame, which effectively reduces the range of the rotation angle estimation, may reduce the number of iteration updates in the rotation angle estimation, and improves the speed of the rotation angle estimation.

In some alternative implementations of the foregoing embodiments described in conjunction with FIG. 2 and FIG. 3, the difference in rotation angle when the depth camera acquires the depth image corresponding to a three-dimensional point cloud frame and the depth image corresponding to the previous three-dimensional point cloud frame may be calculated frame by frame. Specifically, determining a matching point between three-dimensional point cloud frames in the three-dimensional point cloud sequence in the above step 203 or step 304 may include: determining, for each current three-dimensional point cloud frame in the three-dimensional point cloud sequence, a matching point between the current three-dimensional point cloud frame and the previous three-dimensional point cloud frame of the current three-dimensional point cloud frame. That is, the matching point between each current three-dimensional point cloud frame and the previous three-dimensional point cloud frame of the current three-dimensional point cloud frame may be determined frame by frame.

In this case, based on the matching point between the three-dimensional point cloud frames, the rotation angle of the binocular camera may be determined as the rotation angle of the engineering mechanical device as follows.

First, for each current three-dimensional point cloud frame in the three-dimensional point cloud sequence, based on the three-dimensional coordinates of the matching point between the current three-dimensional point cloud frame and the previous three-dimensional point cloud frame of the current three-dimensional point cloud frame in the current three-dimensional point cloud frame and the previous three-dimensional point cloud frame of the current three-dimensional point cloud frame, the rotation angle between the current three-dimensional point cloud frame and the depth image frame corresponding to the previous three-dimensional point cloud frame of the current three-dimensional point cloud frame is estimated.

The specific estimation method is to initialize the rotation matrix R and the translation matrix T characterizing a rotation parameter and a translation parameter of the camera between depth image frames corresponding to two adjacent three-dimensional point cloud frames, and iteratively update the rotation matrix R and the translation matrix T using the ICP algorithm described in step 203. Thereby, the rotation angle between the depth image frames corresponding to each adjacent two three-dimensional point cloud frames may be obtained.

Then, rotation angles between depth image frames corresponding to adjacent three-dimensional point cloud frames in the three-dimensional point cloud sequence may be added sequentially according to positions of corresponding depth images in the depth image sequence, to obtain a relative rotation angle of the binocular camera when acquiring images between the first frame image and the last frame image in the depth image sequence as the rotation angle of the engineering mechanical device. For example, the depth image sequence includes $I_1, I_2, I_3, \ldots, I_N$, a total of N image frames (N is a positive integer), where the point clouds corresponding to $I_1, I_2$ are estimated to be $C_1, C_2$, and the corresponding rotation angle is $\alpha 1$; the point clouds corresponding to $I_2, I_3$ are $C_2$ and $C_3$, and the corresponding rotation angle is $\alpha 2$; the point clouds corresponding to $I_3, I_4$ are $C_3$ and $C_4$, and the corresponding rotation angle is $\alpha 3, \ldots$, the point clouds corresponding to $I_{N-1}, I_N$ are $C_{N-1}, C_N$, and the corresponding rotation angle is $\alpha(N-1)$, then the relative rotation angle of the camera when acquiring image frames between $I_1$ and $I_N$ is $\alpha 1 + \alpha 2 + \alpha 3 + \ldots + \alpha(N-1)$.

Since the acquisition time interval between adjacent image frames is short and the rotation angle of the camera is small, the number of matching points in adjacent three-dimensional point cloud frames is large. By calculating the rotation angle between the image corresponding to the current three-dimensional point cloud frame and the image corresponding to the previous three-dimensional point cloud frame frame-by-frame, and sequentially adding the calculated rotation angles corresponding to the adjacent frames to obtain the rotation angle of the camera during the rotation of the rotating portion of the engineering mechanical device, the rotation angle corresponding to the adjacent two frames may be accurately calculated using a large number of matching points between the two adjacent frames, to ensure the accuracy of the calculated rotation angle of the camera during the rotation of the rotating portion of the engineering mechanical device.

In other alternative implementations of the embodiments described above in conjunction with FIG. 2 and FIG. 3, the three-dimensional point cloud sequence may be down sampled first, and the down sampled three-dimensional point cloud sequence may be processed. Specifically, determining the matching point between the three-dimensional point cloud frames in the three-dimensional point cloud sequence in the above step 203 or step 304 may include: sampling a three-dimensional point cloud frame in the three-dimensional point cloud sequence to obtain a sampling sequence, where the sampling sequence includes a first three-dimensional point cloud frame and a last three-dimensional point cloud frame in the three-dimensional point cloud sequence; and determining, for each three-dimensional point cloud frame pair composed of adjacent three-dimensional point cloud frames in the sampling sequence, a matching point between two three-dimensional point cloud frames in the three-dimensional point cloud frame pair. Specifically, the three-dimensional point cloud sequence may be sampled to obtain a sampling sequence, and for each two adjacent three-dimensional point cloud frames in the sampling sequence, the matching point is determined based on the coordinates of the three-dimensional point and the color or depth information.

In this case, in the above step 203 or step 304, the determining a rotation angle of the binocular camera during the rotation of the rotating portion of the engineering mechanical device based on the matching point between the three-dimensional point cloud frames as the rotation angle of the engineering mechanical device, may include: estimating, based on three-dimensional coordinates of the matching point between the two three-dimensional point cloud frames in the three-dimensional point cloud frame pair, a rotation angle between depth image frames corresponding to the two three-dimensional point cloud frames in the three-dimensional point cloud frame pair; and adding sequentially rotation angles between depth image frames corresponding to two three-dimensional point cloud frames in three-dimensional point cloud frame pairs according to positions of corresponding depth images in the depth image sequence, to obtain a relative rotation angle of the binocular camera when acquiring images between the first frame image and the last frame image in the depth image sequence as the rotation angle of the engineering mechanical device.

In the sampling sequence, two adjacent three-dimensional point cloud frames form a three-dimensional point cloud frame pair. Specifically, the first frame and the second frame form a three-dimensional point cloud frame pair, the second frame and the third frame form a three-dimensional point cloud frame pair, the third frame and the fourth frame form a three-dimensional point cloud frame pair, and so on. For each three-dimensional point cloud frame pair, the relative rotation angle of the camera when acquiring image frames between the two image frames in the three-dimensional point cloud frame pair may be calculated using the method described in the above step 203. Then, the corresponding rotation angles of the three-dimensional point cloud frame pairs are sequentially added to obtain the rotation angle of the rotating portion of the engineering mechanical device.

By sampling the three-dimensional point cloud frame sequence to obtain a sampling sequence, and calculating a corresponding rotation angle based on the matching points between the three-dimensional point cloud frames in the sampling sequence, the calculation amount may be effectively reduced, and the estimation speed of the rotation angle of the rotating portion of the engineering mechanical device may be improved. In addition, by keeping the three-dimensional point cloud frames corresponding to the first image frame and the last image frame in the depth image sequence to the sampling sequence at the time of sampling, it is ensured that the rotation angle of the rotating portion of the engineering mechanical device obtained in steps 203 and 304 is the rotation angle from the time when the camera starts image acquisition to the time when the camera stops the image acquisition, thereby ensuring the accuracy of the calculation result of the rotation angle of the rotating portion of the engineering mechanical device.

Figure 4:
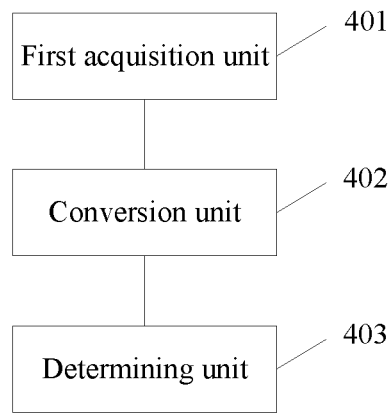
FIG. 4 is a schematic structural diagram of an apparatus for determining a rotation angle of an engineering mechanical device according to an embodiment of the present disclosure.

With further reference to FIG. 4, as an implementation of the method shown in the above figures, the present disclosure provides an apparatus for determining a rotation angle of an engineering mechanical device according to an embodiment of the present disclosure, and the apparatus embodiment corresponds to the method embodiments as shown in FIG. 2 and FIG. 3, and the apparatus may be specifically applied to various electronic devices.

As shown in FIG. 4, an apparatus 400 for determining a rotation angle of an engineering mechanical device of the present embodiment includes: a first acquisition unit 401, a conversion unit 402 and a determining unit 403. The first acquisition unit 401 is configured to acquire a depth image sequence acquired by a binocular camera disposed at a rotating portion of the engineering mechanical device during rotation of the rotating portion of the engineering mechanical device. The conversion unit 402 is configured to convert the depth image sequence into a three-dimensional point cloud sequence. The determining unit 403 is configured to determine a matching point between three-dimensional point cloud frames in the three-dimensional point cloud sequence, determine a rotation angle of the binocular camera during the rotation of the rotating portion of the engineering mechanical device based on the matching point between the three-dimensional point cloud frames as the rotation angle of the engineering mechanical device.

In some embodiments, the apparatus 400 may further include: a second acquisition unit, configured to acquire rotation angle sensing data acquired by an angle sensor disposed on a rotating shaft of the rotating portion of the engineering mechanical device during the rotation of the rotating portion of the engineering mechanical device. Here, the determining unit 403 may be further configured to determine a rotation angle of the binocular camera as follows: using rotation angle sensing data corresponding to the three-dimensional point cloud frames as an initial estimation range of a rotation angle corresponding to the three-dimensional point cloud frames, and determining the rotation angle of the binocular camera based on the matching point between the three-dimensional point cloud frames within the initial estimation range.

In some embodiments, the determining unit 403 may be further configured to determine a matching point between three-dimensional point cloud frames in the three-dimensional point cloud sequence as follows: determining, for each current three-dimensional point cloud frame in the three-dimensional point cloud sequence, a matching point between the current three-dimensional point cloud frame and a previous three-dimensional point cloud frame of the current three-dimensional point cloud frame; and the determining unit 403 may be further configured to determine a rotation angle of the binocular camera based on the matching point between the three-dimensional point cloud frames as the rotation angle of the engineering mechanical device as follows: estimating, for each current three-dimensional point cloud frame in the three-dimensional point cloud sequence, based on three-dimensional coordinates of the matching point between the current three-dimensional point cloud frame and the previous three-dimensional point cloud frame of the current three-dimensional point cloud frame in the current three-dimensional point cloud frame and the previous three-dimensional point cloud frame of the current three-dimensional point cloud frame, a rotation angle between the current three-dimensional point cloud frame and a depth image frame corresponding to the previous three-dimensional point cloud frame of the current three-dimensional point cloud frame; and adding sequentially rotation angles between depth image frames corresponding to adjacent three-dimensional point cloud frames in the three-dimensional point cloud sequence according to positions of corresponding depth images in the depth image sequence, to obtain a relative rotation angle of the binocular camera when acquiring images between a first frame image and a last frame image in the depth image sequence as the rotation angle of the engineering mechanical device.

In some embodiments, the determining unit 403 may be further configured to determine a matching point between three-dimensional point cloud frames in the three-dimensional point cloud sequence as follows: sampling a three-dimensional point cloud frame in the three-dimensional point cloud sequence to obtain a sampling sequence, where the sampling sequence includes a first three-dimensional point cloud frame and a last three-dimensional point cloud frame in the three-dimensional point cloud sequence; determining, for each three-dimensional point cloud frame pair composed of adjacent three-dimensional point cloud frames in the sampling sequence, a matching point between two three-dimensional point cloud frames in the three-dimensional point cloud frame pair; and the determining unit 403 may be further configured to determine a rotation angle of the binocular camera based on the matching point between the three-dimensional point cloud frames as the rotation angle of the engineering mechanical device as follows: estimating, based on three-dimensional coordinates of the matching point between the two three-dimensional point cloud frames in the three-dimensional point cloud frame pair, a rotation angle between depth image frames corresponding to the two three-dimensional point cloud frames in the three-dimensional point cloud frame pair; and adding sequentially rotation angles between depth image frames corresponding to two three-dimensional point cloud frames in three-dimensional point cloud frame pairs according to positions of corresponding depth images in the depth image sequence, to obtain a relative rotation angle of the binocular camera when acquiring images between a first frame image and a last frame image in the depth image sequence as the rotation angle of the engineering mechanical device.

In some embodiments, the determining unit 403 may be further configured to determine a matching point between three-dimensional point cloud frames in the three-dimensional point cloud sequence as follows: performing feature point extraction on the three-dimensional point cloud frames; and matching feature points of two extracted three-dimensional point cloud frames to obtain a matching point between the two three-dimensional point cloud frames.

It should be understood that the units described in the apparatus 400 respectively correspond to the steps in the method described with reference to FIG. 2 and FIG. 3. Thus, the operations and features described above for the method are equally applicable to the apparatus 400 and the units contained therein, and detailed description thereof will be omitted.

The apparatus 400 for determining a rotation angle of an engineering mechanical device provided by the above embodiment of the present disclosure, by acquiring a depth image sequence acquired by a binocular camera disposed at a rotating portion of the engineering mechanical device during rotation of the rotating portion of the engineering mechanical device, converting the depth image sequence into a three-dimensional point cloud sequence, and determining a matching point between three-dimensional point cloud frames in the three-dimensional point cloud sequence, determining a rotation angle of the binocular camera during the rotation of the rotating portion of the engineering mechanical device based on the matching point between the three-dimensional point cloud frames as the rotation angle of the engineering mechanical device, achieves accurate calculation of the rotation angle of the engineering mechanical device.

Figure 5:
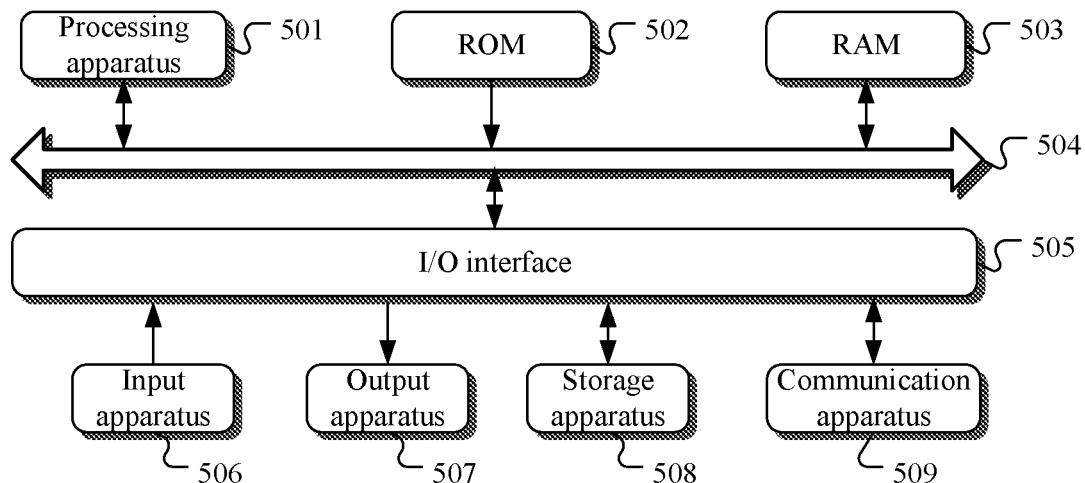
FIG. 5 is a schematic structural diagram of a computer system adapted to implement an electronic device of the embodiments of the present disclosure.

With further reference to FIG. 5, a schematic structural diagram of a computer system adapted to implement an electronic device 500 (e.g., the server in FIG. 1) of the embodiments of the present disclosure is shown. The computer system shown in FIG. 5 is merely an example, and should not impose any limitation on the function and scope of use of the embodiments of the present disclosure.

As shown in FIG. 5, the computer system 500 may include a processing apparatus (e.g., central processing unit, graphics processor, etc.) 501, which may execute various appropriate actions and processes in accordance with a program stored in a read-only memory (ROM) 502 or a program loaded into a random access memory (RAM) 503 from a storage apparatus 508. The RAM 503 also stores various programs and data required by operations of the computer system 500. The processing apparatus 501, the ROM 502 and the RAM 503 are connected to each other through a bus 504. An input/output (I/O) interface 505 is also connected to the bus 504.

Typically, the following apparatuses may be connected to the I/O interface 505: an input apparatus 506 including a touch screen, touch pad, keyboard, mouse, camera, microphone, accelerometer, gyroscope and the like; an output apparatus 507 including a liquid crystal display (LCD), a speaker, a vibrator and the like; a storage apparatus 508 including a hard disk and the like; and a communication apparatus 509. The communication portion 509 may allow the electronic device 500 to communicate in a wired or wireless connection with other devices to exchange data. Although FIG. 5 illustrates the computer system 500 having various apparatuses, it should be understood that it is not required to implement or have all of the illustrated apparatuses. More or less apparatuses may be alternatively implemented or possessed. Each block shown in FIG. 5 may represent one apparatus or may represent a plurality of apparatuses as desired.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 509, or may be installed from the storage apparatus 508 or from the ROM 502. The computer program, when executed by the processing apparatus 501, implements the above mentioned functionalities as defined by the method of the embodiments of the present disclosure. It should be noted that the computer readable medium described by the embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the embodiments of the present disclosure, the computer readable storage medium may be any physical medium containing or storing programs which may be used by a command execution system, apparatus or element or incorporated thereto. While in the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wired, optical cable, RF medium etc., or any suitable combination of the above.

The computer readable medium may be included in the above electronic device, or a stand-alone computer readable medium not assembled into the electronic device. The computer readable medium stores one or more programs. The one or more programs, when executed by the electronic device, cause the electronic device to: acquire a depth image sequence acquired by a binocular camera disposed at a rotating portion of the engineering mechanical device during rotation of the rotating portion of the engineering mechanical device; convert the depth image sequence into a three-dimensional point cloud sequence; and determine a matching point between three-dimensional point cloud frames in the three-dimensional point cloud sequence, determine a rotation angle of the binocular camera during the rotation of the rotating portion of the engineering mechanical device based on the matching point between the three-dimensional point cloud frames as the rotation angle of the engineering mechanical device.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved.

It should also be noted that each block in the block diagrams and/or flowcharts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a first acquisition unit, a conversion unit, and a determining unit. Here, the names of these units do not in some cases constitute a limitation to such units themselves. For example, the first acquisition unit may also be described as "a unit configured to acquire a depth image sequence acquired by a binocular camera disposed at a rotating portion of the engineering mechanical device during rotation of the rotating portion of the engineering mechanical device."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for determining a rotation angle of an engineering mechanical device, the method comprising:
    acquiring a depth image sequence acquired by a binocular camera disposed at a rotating portion of the engineering mechanical device during rotation of the rotating portion of the engineering mechanical device;
    converting the depth image sequence into a three-dimensional point cloud sequence; and
    determining a matching point between three-dimensional point cloud frames in the three-dimensional point cloud sequence, and determining a rotation angle of the binocular camera during the rotation of the rotating portion of the engineering mechanical device based on the matching point between the three-dimensional point cloud frames as the rotation angle of the engineering mechanical device, wherein the determining a rotation angle of the binocular camera during the rotation of the rotating portion of the engineering mechanical device based on the matching point between the three-dimensional point cloud frames, comprises:
    using rotation angle sensing data corresponding to the three-dimensional point cloud frames as an initial estimation range of a rotation angle corresponding to the three-dimensional point cloud frames, and determining the rotation angle of the binocular camera during the rotation of the rotating portion of the engineering mechanical device based on the matching point between the three-dimensional point cloud frames within the initial estimation range.

2. The method according to claim 1, wherein the method further comprises:
    acquiring rotation angle sensing data acquired by an angle sensor disposed on a rotating shaft of the rotating portion of the engineering mechanical device during the rotation of the rotating portion of the engineering mechanical device.

3. The method according to claim 1, wherein the determining a matching point between three-dimensional point cloud frames in the three-dimensional point cloud sequence comprises:
determining, for each current three-dimensional point cloud frame in the three-dimensional point cloud sequence, a matching point between the current three-dimensional point cloud frame and a previous three-dimensional point cloud frame of the current three-dimensional point cloud frame; and
the determining a rotation angle of the binocular camera during the rotation of the rotating portion of the engineering mechanical device based on the matching point between the three-dimensional point cloud frames as the rotation angle of the engineering mechanical device, comprises:
estimating, for each current three-dimensional point cloud frame in the three-dimensional point cloud sequence, based on three-dimensional coordinates of the matching point between the current three-dimensional point cloud frame and the previous three-dimensional point cloud frame of the current three-dimensional point cloud frame in the current three-dimensional point cloud frame and the previous three-dimensional point cloud frame of the current three-dimensional point cloud frame, a rotation angle between the current three-dimensional point cloud frame and a depth image frame corresponding to the previous three-dimensional point cloud frame of the current three-dimensional point cloud frame; and
adding sequentially rotation angles between depth image frames corresponding to adjacent three-dimensional point cloud frames in the three-dimensional point cloud sequence according to positions of corresponding depth images in the depth image sequence, to obtain a relative rotation angle of the binocular camera when acquiring images between a first frame image and a last frame image in the depth image sequence as the rotation angle of the engineering mechanical device.

4. The method according to claim 1, wherein the determining a matching point between three-dimensional point cloud frames in the three-dimensional point cloud sequence comprises:
sampling a three-dimensional point cloud frame in the three-dimensional point cloud sequence to obtain a sampling sequence, wherein the sampling sequence comprises a first three-dimensional point cloud frame and a last three-dimensional point cloud frame in the three-dimensional point cloud sequence;
determining, for each three-dimensional point cloud frame pair composed of adjacent three-dimensional point cloud frames in the sampling sequence, a matching point between two three-dimensional point cloud frames in the three-dimensional point cloud frame pair; and
the determining a rotation angle of the binocular camera during the rotation of the rotating portion of the engineering mechanical device based on the matching point between the three-dimensional point cloud frames as the rotation angle of the engineering mechanical device, comprises:
estimating, based on three-dimensional coordinates of the matching point between the two three-dimensional point cloud frames in the three-dimensional point cloud frame pair, a rotation angle between depth image frames corresponding to the two three-dimensional point cloud frames in the three-dimensional point cloud frame pair; and
adding sequentially rotation angles between depth image frames corresponding to two three-dimensional point cloud frames in three-dimensional point cloud frame pairs according to positions of corresponding depth images in the depth image sequence, to obtain a relative rotation angle of the binocular camera when acquiring images between a first frame image and a last frame image in the depth image sequence as the rotation angle of the engineering mechanical device.

5. The method according to claim 1, wherein the determining a matching point between three-dimensional point cloud frames in the three-dimensional point cloud sequence comprises:
performing feature point extraction on the three-dimensional point cloud frames; and
matching feature points of two extracted three-dimensional point cloud frames to obtain a matching point between the two three-dimensional point cloud frames.

6. An apparatus for determining a rotation angle of an engineering mechanical device, the apparatus comprising:
at least one processor; and
a memory storing instructions, wherein the instructions when executed by the at least one processor, cause the at least one processor to perform operations, the operations comprising:
acquiring a depth image sequence acquired by a binocular camera disposed at a rotating portion of the engineering mechanical device during rotation of the rotating portion of the engineering mechanical device;
converting the depth image sequence into a three-dimensional point cloud sequence; and
determining a matching point between three-dimensional point cloud frames in the three-dimensional point cloud sequence, and determining a rotation angle of the binocular camera during the rotation of the rotating portion of the engineering mechanical device based on the matching point between the three-dimensional point cloud frames as the rotation angle of the engineering mechanical device, wherein the determining a rotation angle of the binocular camera during the rotation of the rotating portion of the engineering mechanical device based on the matching point between the three-dimensional point cloud frames, comprises:
using rotation angle sensing data corresponding to the three-dimensional point cloud frames as an initial estimation range of a rotation angle corresponding to the three-dimensional point cloud frames, and determining the rotation angle of the binocular camera during the rotation of the rotating portion of the engineering mechanical device based on the matching point between the three-dimensional point cloud frames within the initial estimation range.

7. The apparatus according to claim 6, wherein the operations further comprise:
acquiring rotation angle sensing data acquired by an angle sensor disposed on a rotating shaft of the rotating portion of the engineering mechanical device during the rotation of the rotating portion of the engineering mechanical device.

8. The apparatus according to claim 6, wherein the determining a matching point between three-dimensional point cloud frames in the three-dimensional point cloud sequence comprises:
determining, for each current three-dimensional point cloud frame in the three-dimensional point cloud sequence, a matching point between the current three-dimensional point cloud frame and a previous three-dimensional point cloud frame of the current three-dimensional point cloud frame; and
the determining a rotation angle of the binocular camera during the rotation of the rotating portion of the engineering mechanical device based on the matching point between the three-dimensional point cloud frames as the rotation angle of the engineering mechanical device, comprises:
estimating, for each current three-dimensional point cloud frame in the three-dimensional point cloud sequence, based on three-dimensional coordinates of the matching point between the current three-dimensional point cloud frame and the previous three-dimensional point cloud frame of the current three-dimensional point cloud frame in the current three-dimensional point cloud frame and the previous three-dimensional point cloud frame of the current three-dimensional point cloud frame, a rotation angle between the current three-dimensional point cloud frame and a depth image frame corresponding to the previous three-dimensional point cloud frame of the current three-dimensional point cloud frame; and
adding sequentially rotation angles between depth image frames corresponding to adjacent three-dimensional point cloud frames in the three-dimensional point cloud sequence according to positions of corresponding depth images in the depth image sequence, to obtain a relative rotation angle of the binocular camera when acquiring images between a first frame image and a last frame image in the depth image sequence as the rotation angle of the engineering mechanical device.

9. The apparatus according to claim 6, wherein the determining a matching point between three-dimensional point cloud frames in the three-dimensional point cloud sequence comprises:
sampling a three-dimensional point cloud frame in the three-dimensional point cloud sequence to obtain a sampling sequence, wherein the sampling sequence comprises a first three-dimensional point cloud frame and a last three-dimensional point cloud frame in the three-dimensional point cloud sequence;
determining, for each three-dimensional point cloud frame pair composed of adjacent three-dimensional point cloud frames in the sampling sequence, a matching point between two three-dimensional point cloud frames in the three-dimensional point cloud frame pair; and
the determining a rotation angle of the binocular camera during the rotation of the rotating portion of the engineering mechanical device based on the matching point between the three-dimensional point cloud frames as the rotation angle of the engineering mechanical device, comprises:
estimating, based on three-dimensional coordinates of the matching point between the two three-dimensional point cloud frames in the three-dimensional point cloud frame pair, a rotation angle between depth image frames corresponding to the two three-dimensional point cloud frames in the three-dimensional point cloud frame pair; and
adding sequentially rotation angles between depth image frames corresponding to two three-dimensional point cloud frames in three-dimensional point cloud frame pairs according to positions of corresponding depth images in the depth image sequence, to obtain a relative rotation angle of the binocular camera when acquiring images between a first frame image and a last frame image in the depth image sequence as the rotation angle of the engineering mechanical device.

10. The apparatus according to claim 6, wherein the determining a matching point between three-dimensional point cloud frames in the three-dimensional point cloud sequence comprises:
performing feature point extraction on the three-dimensional point cloud frames; and
matching feature points of two extracted three-dimensional point cloud frames to obtain a matching point between the two three-dimensional point cloud frames.

11. A non-transitory computer readable medium, storing a computer program thereon, the program, when executed by a processor, causes the processor to perform operations, the operations comprising:
acquiring a depth image sequence acquired by a binocular camera disposed at a rotating portion of an engineering mechanical device during rotation of the rotating portion of the engineering mechanical device;
converting the depth image sequence into a three-dimensional point cloud sequence; and
determining a matching point between three-dimensional point cloud frames in the three-dimensional point cloud sequence, and determining a rotation angle of the binocular camera during the rotation of the rotating portion of the engineering mechanical device based on the matching point between the three-dimensional point cloud frames as the rotation angle of the engineering mechanical device, wherein the determining a rotation angle of the binocular camera during the rotation of the rotating portion of the engineering mechanical device based on the matching point between the three-dimensional point cloud frames, comprises:
using rotation angle sensing data corresponding to the three-dimensional point cloud frames as an initial estimation range of a rotation angle corresponding to the three-dimensional point cloud frames, and determining the rotation angle of the binocular camera during the rotation of the rotating portion of the engineering mechanical device based on the matching point between the three-dimensional point cloud frames within the initial estimation range.

12. The non-transitory computer readable medium according to claim 11, wherein the operations further comprise:
acquiring rotation angle sensing data acquired by an angle sensor disposed on a rotating shaft of the rotating portion of the engineering mechanical device during the rotation of the rotating portion of the engineering mechanical device.

13. The non-transitory computer readable medium according to claim 11, wherein the determining a matching point between three-dimensional point cloud frames in the three-dimensional point cloud sequence comprises:
determining, for each current three-dimensional point cloud frame in the three-dimensional point cloud sequence, a matching point between the current three-dimensional point cloud frame and a previous three-dimensional point cloud frame of the current three-dimensional point cloud frame; and the determining a rotation angle of the binocular camera during the rotation of the rotating portion of the engineering mechanical device based on the matching point between the three-dimensional point cloud frames as the rotation angle of the engineering mechanical device, comprises:

estimating, for each current three-dimensional point cloud frame in the three-dimensional point cloud sequence, based on three-dimensional coordinates of the matching point between the current three-dimensional point cloud frame and the previous three-dimensional point cloud frame of the current three-dimensional point cloud frame in the current three-dimensional point cloud frame and the previous three-dimensional point cloud frame of the current three-dimensional point cloud frame, a rotation angle between the current three-dimensional point cloud frame and a depth image frame corresponding to the previous three-dimensional point cloud frame of the current three-dimensional point cloud frame; and adding sequentially rotation angles between depth image frames corresponding to adjacent three-dimensional point cloud frames in the three-dimensional point cloud sequence according to positions of corresponding depth images in the depth image sequence, to obtain a relative rotation angle of the binocular camera when acquiring images between a first frame image and a last frame image in the depth image sequence as the rotation angle of the engineering mechanical device.

14. The non-transitory computer readable medium according to claim 11, wherein the determining a matching point between three-dimensional point cloud frames in the three-dimensional point cloud sequence comprises:

sampling a three-dimensional point cloud frame in the three-dimensional point cloud sequence to obtain a sampling sequence, wherein the sampling sequence comprises a first three-dimensional point cloud frame and a last three-dimensional point cloud frame in the three-dimensional point cloud sequence;

determining, for each three-dimensional point cloud frame pair composed of adjacent three-dimensional point cloud frames in the sampling sequence, a matching point between two three-dimensional point cloud frames in the three-dimensional point cloud frame pair; and the determining a rotation angle of the binocular camera during the rotation of the rotating portion of the engineering mechanical device based on the matching point between the three-dimensional point cloud frames as the rotation angle of the engineering mechanical device, comprises:

estimating, based on three-dimensional coordinates of the matching point between the two three-dimensional point cloud frames in the three-dimensional point cloud frame pair, a rotation angle between depth image frames corresponding to the two three-dimensional point cloud frames in the three-dimensional point cloud frame pair; and adding sequentially rotation angles between depth image frames corresponding to two three-dimensional point cloud frames in three-dimensional point cloud frame pairs according to positions of corresponding depth images in the depth image sequence, to obtain a relative rotation angle of the binocular camera when acquiring images between a first frame image and a last frame image in the depth image sequence as the rotation angle of the engineering mechanical device.

15. The non-transitory computer readable medium according to claim 11, wherein the determining a matching point between three-dimensional point cloud frames in the three-dimensional point cloud sequence comprises:

performing feature point extraction on the three-dimensional point cloud frames; and matching feature points of two extracted three-dimensional point cloud frames to obtain a matching point between the two three-dimensional point cloud frames.

* * * * *